United States Patent

Dalton et al.

Patent Number: 5,573,565
Date of Patent: Nov. 12, 1996

[54] METHOD OF MAKING AN INTEGRAL WINDOW HERMETIC FIBER OPTIC COMPONENT

[75] Inventors: Rick D. Dalton, Miamisburg; Daniel P. Kramer, Centerville; Richard T. Massey, Hamilton; Damon A. Waker, Bellbrook, all of Ohio

[73] Assignee: The United States of America as represented by the Department of Energy, Washington, D.C.

[21] Appl. No.: 262,125

[22] Filed: Jun. 17, 1994

[51] Int. Cl.$^6$ .......................... C03C 27/02; B23B 31/26
[52] U.S. Cl. .............. 65/59.1; 65/59.4; 156/89; 156/309.6; 102/201
[58] Field of Search .................. 65/59.1, 59.4; 156/89; 102/201; 264/60

[56] References Cited

U.S. PATENT DOCUMENTS

| | | | |
|---|---|---|---|
| 3,183,361 | 5/1965 | Bronson et al. | 156/89 X |
| 3,812,783 | 5/1974 | Yang et al. | 102/201 |
| 4,617,044 | 10/1986 | Kramer et al. | 65/59.1 X |
| 4,705,585 | 11/1987 | Kelly et al. | 65/59.1 X |
| 4,917,014 | 4/1990 | Loughry et al. | 102/201 |
| 4,930,418 | 6/1990 | Folsom | 102/201 |
| 5,036,767 | 8/1991 | Folsom et al. | 102/201 |
| 5,143,531 | 9/1992 | Kramer | 65/3.11 |

FOREIGN PATENT DOCUMENTS

| | | | |
|---|---|---|---|
| 3838896 | 5/1990 | Germany | 102/201 |
| 1312700 | 4/1973 | United Kingdom | 65/59.1 |

OTHER PUBLICATIONS

Robert H. Dalton, "How to design glass–to–metal joints," Product Engineering, Apr. 26, 1965, pp. 62–71.

James F. Shackelford, Introduction to Materials Science For Engineers, 1985, pp. 150–151, 328–331.

P. W. McMillan, Glass–Ceramics, 1979, p. 48–49.

Primary Examiner—David A. Simmons
Assistant Examiner—M. Curtis Mayes
Attorney, Agent, or Firm—Armand McMillan; James H. Chafin; William R. Moser

[57] ABSTRACT

In the fabrication of igniters, actuators, detonators, and other pyrotechnic devices to be activated by a laser beam, an integral optical glass window is formed by placing a preform in the structural member of the device and then melting the glass and sealing it in place by heating at a temperature between the ceramming temperature of the glass and the melting point of the metal, followed by rapid furnace cooling to avoid devitrification. No other sealing material is needed to achieve hermeticity. A preferred embodiment of this type of device is fabricated by allowing the molten glass to flow further and form a plano-convex lens integral with and at the bottom of the window. The lens functions to decrease the beam divergence caused by refraction of the laser light passing through the window when the device is fired by means of a laser beam.

1 Claim, 6 Drawing Sheets

METHOD OF MAKING AN INTEGRAL WINDOW HERMETIC FIBER OPTIC COMPONENT

The United States Government has rights in this invention pursuant to Contract No. DE-AC04-88DP43495 awarded by the United States Department of Energy to EG&G Mound Applied Technologies.

FIELD OF THE INVENTION

The invention relates generally to the field of pyrotechnic component technology. More specifically, it relates to devices that use a laser, such as a laser diode, instead of electricity to transmit the energy required to ignite the pyrotechnic composition.

DESCRIPTION OF THE PRIOR ART

The current technology used in the fabrication of igniters, actuators, detonators, etc., is based on the use of a bridgewire to set off the pyrotechnic or secondary explosive. This is accomplished by passing a current through pins, which are electrically isolated from each other by an insulating material, to the bridgewire. In most cases, the insulating material is either an alumina ceramic, a glass, or a glass ceramic. The insulating material is multifunctional in that, besides providing electrical insulation, it forms a high quality seal. Although bridgewire components have been basic to numerous systems over the years, they have several inherent safety limitations. These limitations are based on the effect that various levels of electromagnetic radiation have on the components. Because metal electrical feedthroughs (pins) are used in these components, the explosive or pyrotechnic material is not truly isolated from its surroundings.

This safety consideration has been the driving force in the development of a family of hermetic components that would be impervious to spurious levels of electromagnetic radiation. Recent research has centered on developing new components that would not contain bridgewires and pins but would use instead a laser/optical fiber combination. It has been demonstrated that a laser/optical fiber combination can be used to reliably ignite various types of energetic materials. This technology uses a laser diode to produce an output through the optical fiber that has sufficient energy to activate the component.

Three principal header configurations are currently under consideration for fabrication into fiber optic components: direct fiber placement, fiber pins, and windows. Each approach has certain identifiable strengths and weaknesses. Further discussion will be limited to the window-containing fiber optic components, since this approach is the one most closely related to the present invention.

Figure 1:
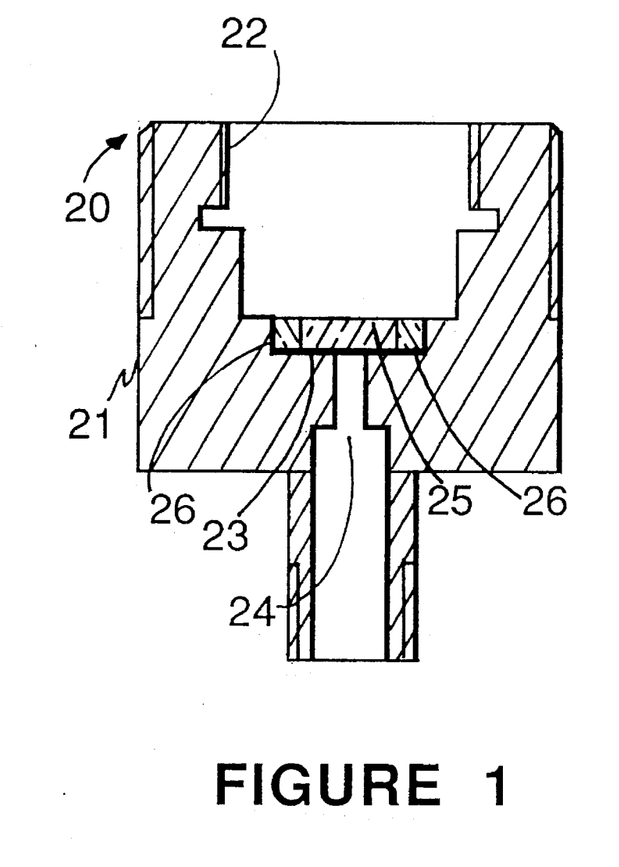
FIG. 1 is a diagrammatic side elevation view, in section, of a pyrotechnic device of the art in which a window is fastened to the device by means of sealing glass.

The fabrication of window-containing devices has in the past required a number of operations. These operations usually start with the purchase or fabrication of a transparent window. The window may take many forms, the most popular being a piece of sapphire or glass that has been machined into a right circular cylinder of the required thickness. After both surfaces of the window have been polished to an optical finish, the window is sealed in place within a metal structural member with a sealing glass, care being taken that the sealing glass has a thermal expansion intermediate between that of the metal member and that of the window used (FIG. 1). Once this is accomplished, a second polishing operation may be required to smooth the surfaces of the window that have become distorted during sealing. If the sealing operation is performed correctly, the thermal expansion stresses will be minimized but not eliminated.

SUMMARY OF THE INVENTION

Figure 2:
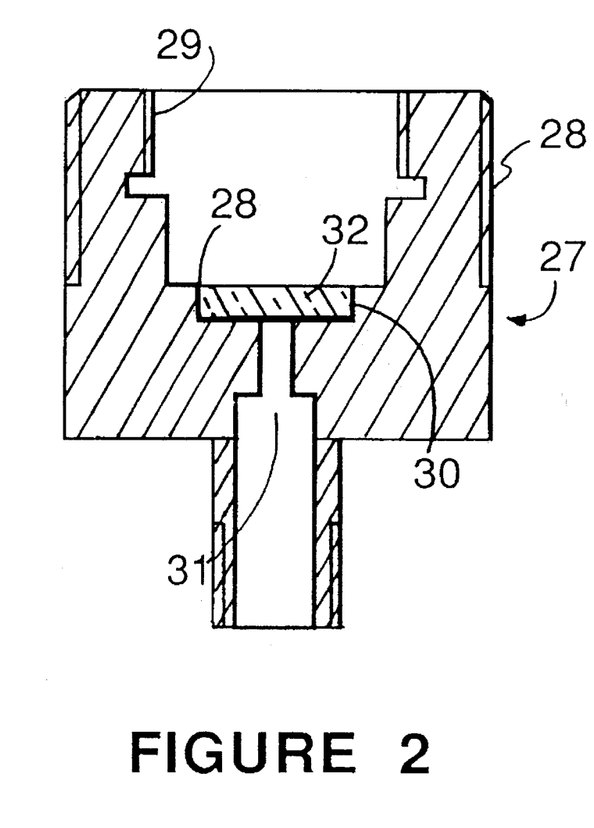
FIG. 2 is a diagrammatic view, similar to FIG. 1, of a pyrotechnic device encompassing an integral window of the type disclosed in this invention.

The present disclosure describes an innovative technique that greatly simplifies the unit processes required to fabricate a window-containing pyrotechnic component. Instead of fabricating the window separately and then sealing it in place, the integral window technique of the invention forms the basis of the window during the sealing operation (FIG. 2). This is accomplished by placing a glass preform within the metal structural member, melting the glass and sealing it in place during a firing cycle. Devitrification of the glass is avoided by heating the glass beyond its ceramming temperature and then by rapid cooling in the furnace used. Once this is done, the integral window component is completed by polishing both sides of the glass, forming a window in place. However, even this final polishing step may not be necessary when the fixturing (which is typically graphite) is highly polished prior to the sealing cycle. By selecting a preform which has a volume equal to the volume of the window cavity and using a highly polished supporting fixture, typically made of graphite, an integral window device can be fabricated in one step. No post-polishing operation is needed because when the fixture is highly polished, the glass surface of the integral window will also be polished.

A preferred embodiment of the invention, which serves to decrease undesirable divergence of the laser beam during actuation of the component, is made by allowing the molten glass to flow beyond the window area and form a plano-convex lens that is integral with and below the resulting window.

Among the objects that the disclosed process achieves over the practices of the prior art are:

1. only one seal is needed;
2. thermal expansion stresses can be greatly reduced since a large number of different glasses can be selected on the basis of the thermal expansion coefficient of the metal;
3. the cost of integral window components is significantly lower since the number of unit operations is greatly reduced;
4. the thickness of the integral window can be selected after sealing, greatly increasing the flexibility of the technique;
5. a plano-convex lens can be formed during the same operation, which ultimately serves to decrease beam divergence during actuation of the component; and
6. integral window components can be fabricated in a belt furnace, that is, in a continuous unit operation.

Other objects, features, advantages, and benefits of the invention will become apparent in the following description taken in conjunction with the following drawings. It is to be understood that the foregoing general description and the following detailed description are illustrative and explanatory, and are not to be considered restrictive of the invention. The accompanying drawings, which are incorporated in and constitute part of the invention, illustrate some embodiments of the invention, and, together with the description, serve to explain the principles of the invention in general terms.

DETAILED DESCRIPTION OF THE INVENTION

In FIG. 1, there is shown a simple diagrammatic side elevation view of a standard window component 20 which consists, for example, of a stainless steel shell or sleeve 21 having a cup-like cavity 22 which comprises a window cavity 23 and has a minor opening 24 through its base. Window 25 is sealed to the shell by sealing glass 26. An integral window component 27, as shown in FIG. 2, also involves a shell 28 having cup-like cavity 29 and window cavity 30, a minor opening 31 through its base, and window 32. As can be observed by comparing FIGS. 1 and 2, the integral window of the invention does not require sealing glass 26 in order to be hermetically attached to the shell.

Figure 3:
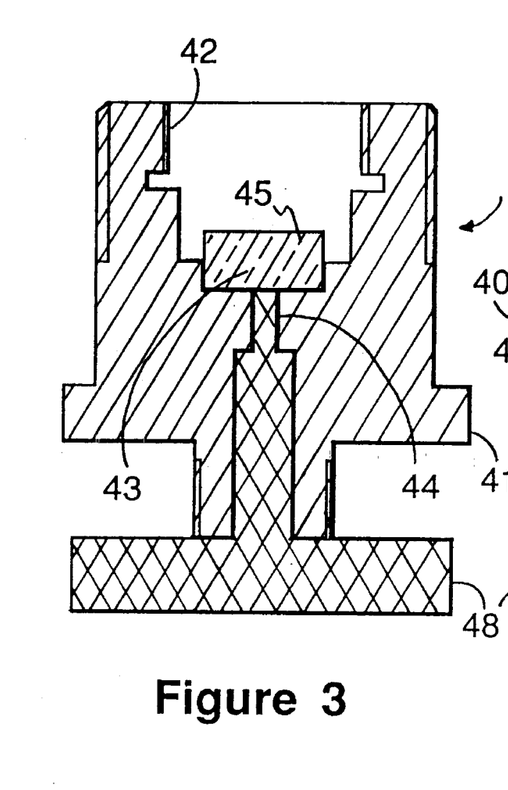
FIG. 3 is a diagrammatic side elevation view of a fixtured pyrotechnic component prior to sealing in a belt furnace.
Figure 4:
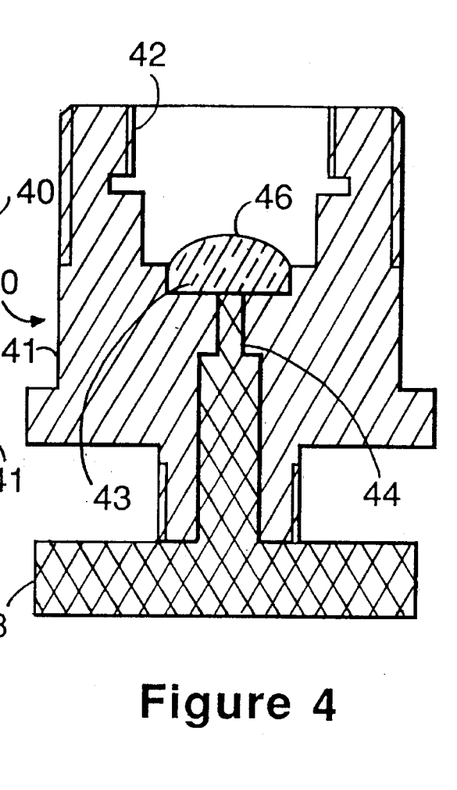
FIG. 4 is another diagrammatic side elevation view of the same component after sealing and before grinding.
Figure 5:
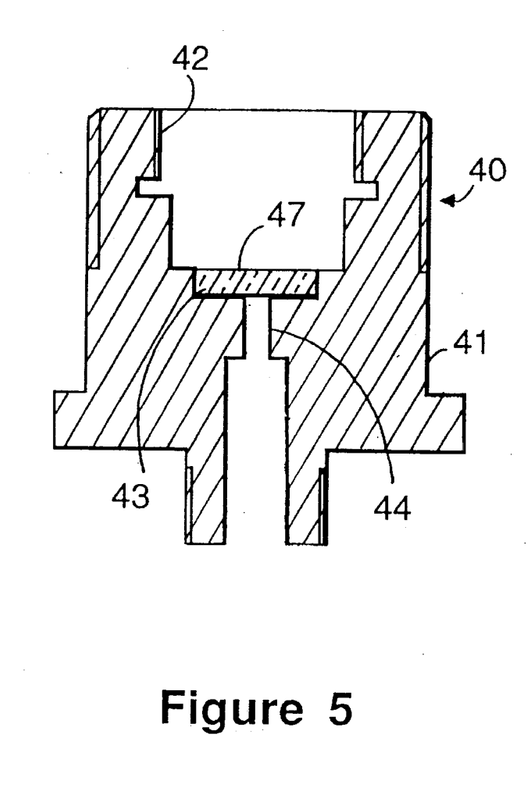
FIG. 5 is a diagrammatic side elevation view of the finished component showing the integral window in place.
Figure 7:
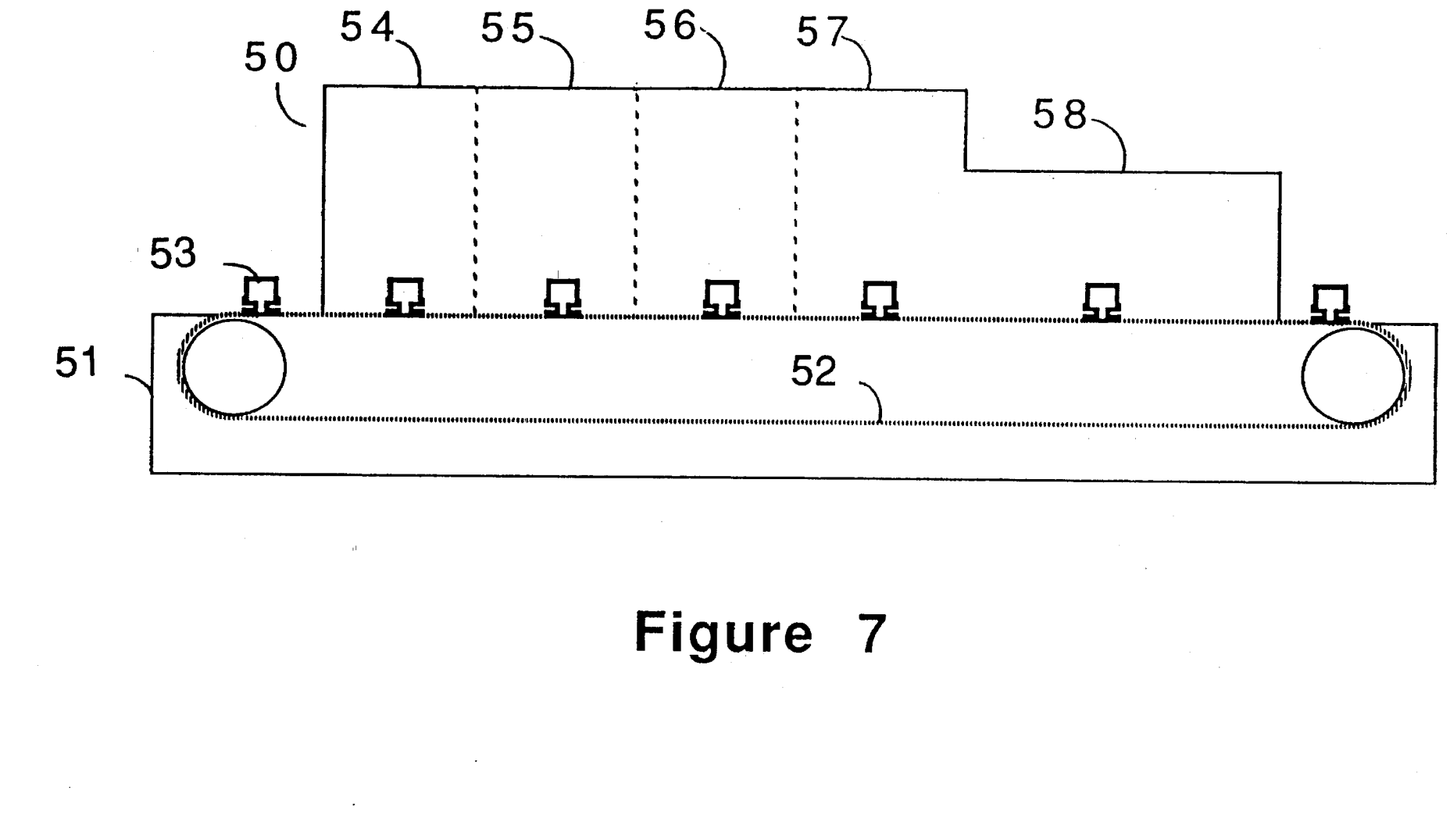
FIG. 7 is a schematic representation of a belt furnace showing the time/temperature regime used in fabricating hermetic integral window components as discussed in Examples 2 and 3 of this specification.

FIGS. 3 to 5 illustrate the window formation process of the invention. In each drawing of window component 40, there is shown a metal shell 41 provided with a cup-like cavity 42, a window cavity 43, a minor opening 44 through the cavity's base. A glass preform 45 is placed in the cup-like cavity (FIG. 3) and is melted. The molten glass 46 is shown as it appears before grinding (FIG. 4). The final integral window 47, as it appears after grinding and polishing, is shown in FIG. 5. In FIGS. 3 and 4, the shells 41 are mounted on graphite fixtures 48 which support them during the sealing process carried out in a belt furnace (FIG. 7).

As shown in FIG. 1, standard window devices contain a transparent member 25 that has been bonded to a metal structural body. These transparent members or polished windows typically are of various thicknesses and are purchased or fabricated separately and then bonded or sealed in place. The window materials have included rutile, various glasses, and most predominantly sapphire. The selection of the window material is based on a number of considerations, including index of refraction, strength, thermal conductivity, thermal expansion, cost, and manufacturability.

The index of refraction of the selected window material is important because a laser beam will diverge or open up upon entering a window. The total divergence is, of course, a function of both the window's thickness and its index of refraction. As the window's thickness increases, beam divergence increases, but, at the same time, as the window's index of refraction increases, beam divergence decreases. The ultimate strength of the window is important also because the component will be subjected to a pressure spike and shock wave during the functioning of the pyrotechnic device. The maximum pressure sustained by the window is a function of the type of device required. Clearly, a thicker window will be stronger, but the trade-off is an increase in beam divergence. Therefore, the design engineer must decide between the amount of beam divergence that is acceptable and the ultimate required strength of the window. An embodiment of the present invention offers a solution to this dilemma (Example 4 and FIG. 9).

The thermal conductivity of the window material influences the energy needed to activate a laser-initiated device. Research has verified that the laser ignition of the pyrotechnic material is, in simple terms, a heating phenomenon. During the functioning of the component, the laser beam's energy is absorbed by the pyrotechnic powder and ignition occurs when the temperature of the powder reaches its ignition point. The window, which is located nearby, acts as a heat sink during the heating of the pyrotechnic powder. High thermal conductivity window materials increase the energy needed to function the component (the threshold value), while low thermal conductivity windows decrease the threshold value.

The thermal expansion of the window material must be considered when selecting a candidate window. When a seal is obtained between the window and a metal shell, the proper thermal expansion relationship will reduce residual stresses that may exist after the completion of the sealing operation. In most cases, the window will be surrounded by a metal shell, which, for best results, requires that the coefficient of thermal expansion of the metal be higher than that of the selected window material. The metal's higher coefficient of thermal expansion will ensure that the seal will be in compression and not in tension. While the coefficients of thermal expansion of most of the metals studied are high (e.g., 304L stainless steel as a coefficient of thermal expansion of $\sim 180 \times 10^{-7}$ cm/cm/°C., RT $-500°$ C.), the use of window material with relatively high coefficients of thermal expansion would be advantageous to minimize the stresses due to the difference between the thermal expansions of the metal and the glass.

The importance of the various physical properties relating to the fabrication of window devices is somewhat subjective. As pointed out earlier, window strength and beam divergence are interrelated because a thicker window will cause greater beam divergence. The magnitude of the divergence is also a function of the material's index of refraction. In the past, much work has been done using sapphire as the window material. However, the thermal conductivity of sapphire is very high, and this limitation has resulted in relatively high threshold devices.

Glasses typically have much lower thermal conductivities than sapphire. For comparison, single crystal sapphire has a reported thermal conductivity of ~0.52 W/(cm°K.) at 273° C., while the glass selected for this work, PM-glass, has a thermal conductivity of ~0.059 W/(cm°K.) at 273° C., as measured by the laser flash diffusivity method. This nearly 100-fold difference in thermal conductivity values between sapphire and PM-glass at room temperature is probably even more exaggerated at expected cold fire temperatures of about $-50°$ C. because sapphire's thermal conductivity increases to ~0.7 W/(cm°K.) at $-50°$ C., while the thermal conductivities of glasses are generally independent of temperature within these temperature regimes. Sapphire's main advantage lies in its strength, but in many applications either high strength is not required or the diameter of the window can be minimized, resulting in the pressure spike being applied to a smaller cross-sectional area.

A few examples are now provided to illustrate various aspects of the invention.

EXAMPLE 1

Figure 6:
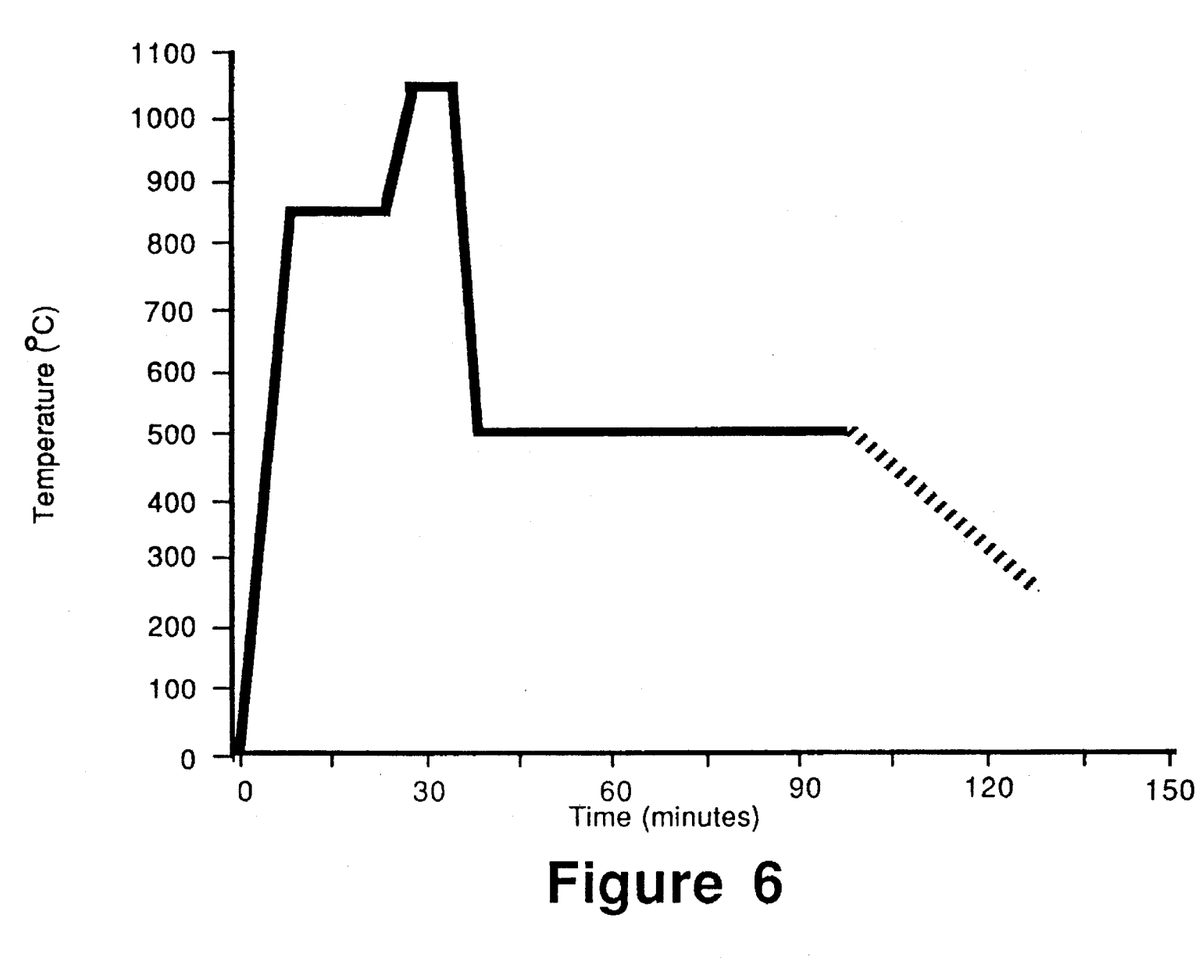
FIG. 6 is a graph showing the batch furnace time/temperature regime used in fabricating hermetic integral window components as discussed in Example 1 of this specification.

The first components were fabricated using Hastelloy C-276 metal shells and a lithia-alumina-silica glass (S-glass). S-glass ceramic is described in U.S. Pat. No. 4,414,282. This type of glass under normal time/temperature processing conditions devitrifies into a glass-ceramic material. For integral window components, however, it is necessary to keep the glass from becoming opaque or devitrifying. This was accomplished by the development of the innovative time/temperature furnace cycle shown in FIG. 6. By heating the S-glass to about 1050° C. and furnace quenching it to about 500° C., as shown in that Figure, it was possible to keep the glass from devitrifying and obtain excellent optical quality (i.e., with optical transmission of greater than 90%). The controlling objective here is to prevent the glass used from becoming a ceramic and losing its transparency. This processing technique has been successfully employed in the fabrication of integral window components. Components fabricated using this technique with 0.020-inch-thick windows have been determined to be helium leak-tight (less than $1\times10^{-8}$ cm$^3$/sec). They have been loaded with a pyrotechnic material and successfully fired with a laser diode.

EXAMPLE 2

Integral window components have also been fabricated using Inconel 718 shells and P-glass preforms. P-glass is a commercial product of Mobay Corporation in Baltimore, Md. It is an aluminoborosilicate glass containing, in part per weight: silica, 49.8; boron oxide, 16.9; sodium oxide, 14.7; alumina, 12.2; potassium oxide, 5.4; fluorine, 1.8; calcium oxide, 0.5; and zinc oxide, 0.7. These integral window components have been developed for applications with high strength requirements. Inconel 718 is a precipitation-hardenable metal which has a high tensile strength when heat-treated, and P-glass has a fairly high coefficient of thermal expansion and a relatively low softening point. Inconel 718 is a nickel-base superalloy manufactured by Huntington Alloys, Inc., Huntington, W. Va. Components have been formed with these materials using a belt furnace with selected time/temperature parameters. These time/temperature parameters are the result of considerable development work, and they yield high-strength integral window components. The process works because these belt furnace parameters provide good glass flow while at the same time precipitation-hardening the Inconel 718 shell. Hermetic components (helium leak rate of less than $1\times10^{-8}$ cm$^3$/sec) containing approximately 0.125-inch integral windows have been fabricated by this process.

As indicated earlier, FIG. 7 schematically shows a belt furnace 50 which comprises heating zones 54 to 57 and a belt assembly 51 equipped with belt 52. Components supported by graphite fixtures 53 moved along with the belt through the four heating zones and through a cooling zone 58. The heating zone temperatures were set at 700° C. (54), 855° C. (55), 865° C. (56), and 625° C. (57). The residence time of each component in the furnace was about 2.5 hours. Time/temperature regimes will, of course, vary depending on the particular glass used and the final window properties desired.

EXAMPLE 3

Components of the type described in Example 2 were fabricated using 303L stainless steel shells and glass preforms of PM-glass. This glass is a slightly modified version of the glass used in Example 2. It has more consistent physical properties than P-glass and is more suitable for use in a continuous belt-furnace type process. It contains, on a parts by weight basis: silica, 48.8; boron oxide, 16.6; sodium oxide, 14.4; alumina, 11.9; potassium oxide, 5.3; fluorine, 2.0; calcium oxide 0.5; and zinc oxide, 0.7. These integral window components were also formed in a belt furnace with selected time/temperature parameters. Components with window thicknesses between 0.008 and 0.040 inch were thus successfully fabricated. They were leak-checked and found to be hermetic, with helium leak rates of less than $1\times10^{-8}$ cm$^3$/sec. Pyrotechnic loaded components of this type were fabricated using an HMX/carbon black blend as the energetic material, and they were successfully activated with a laser diode.

Figure 8:
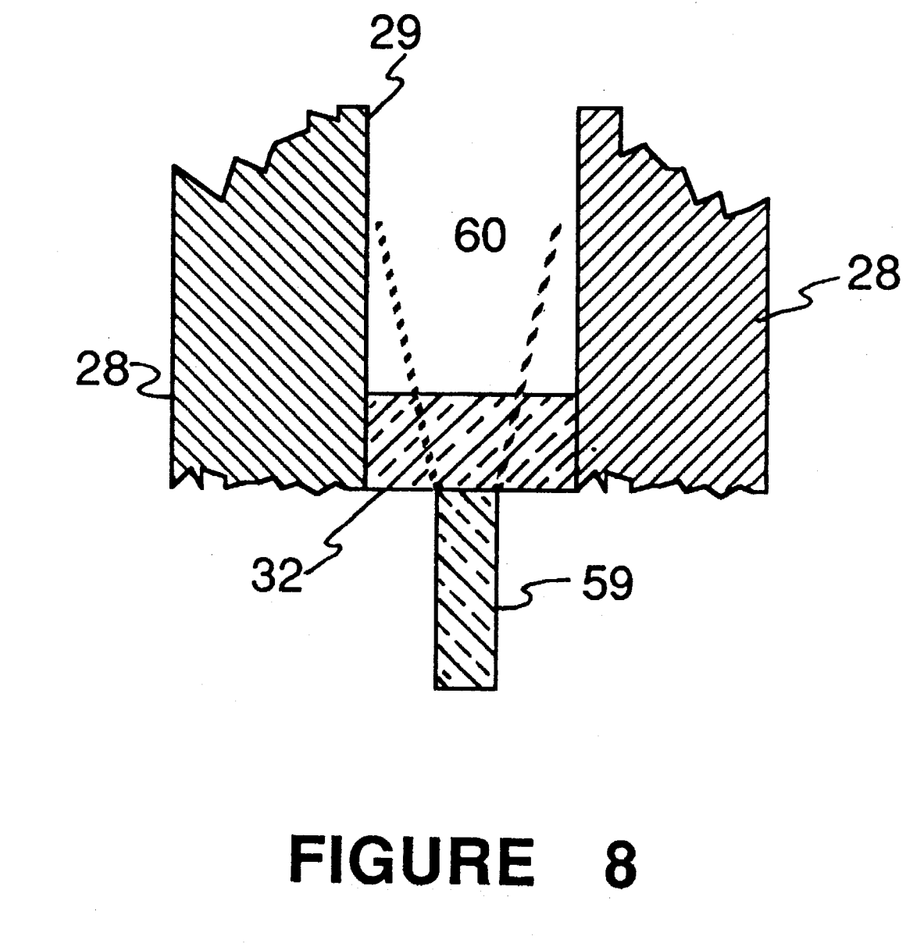
FIG. 8 is a diagrammatic side elevation view of an integral window with the part of the component immediately adjacent to the window.

While it is advantageous to fabricate components with integral windows (FIG. 2), the windows in such components do not act as waveguides and, consequently, laser beams ultimately used with such components diverge as they travel through the glass windows. This phenomenon which occurs with any type of flat windows, integral or not, is illustrated in FIG. 8 where there is shown, in the manner of FIG. 2, the lower part of a shell 28 and cup 29, and flat integral window 32 of component 27. An optical fiber 59 is connected to the lower surface of window 32. When a laser beam is passed through the fiber and window, beam divergence occurs as shown by area 60. As the laser beam diverges, its spot size increases so that, as it exits from the window, the laser energy is distributed across a much larger surface area. This phenomenon can be minimized to some extent by selecting a window material with a more favorable index of refraction and by decreasing the thickness of the window. Decrease in energy concentration can also be compensated for by using a higher energy laser beam, when practicable.

In the past, some attempts have been made to minimize the divergence by placing a separate lens within the component or on the end of the optical waveguide. There will now be described a preferred embodiment of the present invention, i.e., an in situ lens processing technique which, for the first time, makes the lens an integral part of the laser-ignitable component. Such lenses have successfully decreased the magnitude of divergence through the windows.

Figure 9:
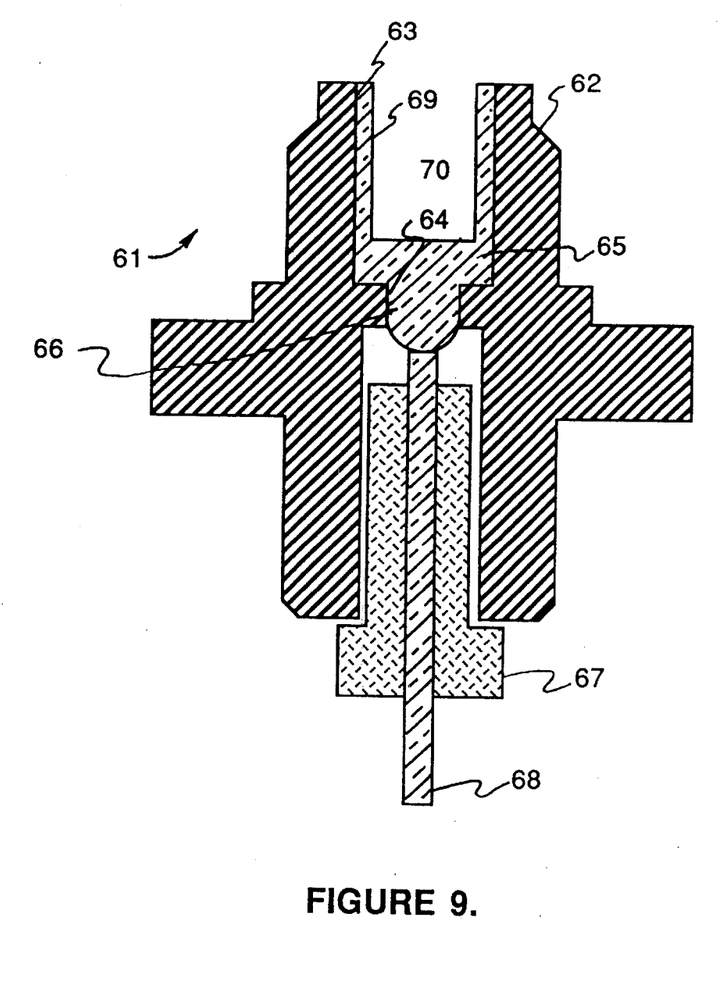
FIG. 9 is a diagrammatic side elevation view of a pyrotechnic device encompassing an integral window that incorporates a plano-convex lens.

FIG. 9 is a diagrammatic side elevation of a preferred embodiment of a pyrotechnic device 61 encompassing an integral window and lens of the type disclosed in this invention. It consists of a stainless steel shell 62 having a cup-like cavity 63 which comprises a minor opening 64 through the cavity's base. After a glass preform has been introduced in the cup-like cavity, melted to form a window and a lens, and after the excess glass has been machined out, the interior of the cup-like cavity is provided with an integral window 65, a lens 66, and a residual glass wall 69 which encloses a pyrotechnic charge cavity 70. The pyrotechnic component assembly is completed by a connector 67 through which is inserted an optical fiber 68 which bring a laser beam to the lens and window.

EXAMPLE 4

The component illustrated in FIG. 9 was provided with a window and a lens in the following manner. The materials used were the same as in Example 2, namely Inconel 718 superalloy and P glass. The glass preform was fabricated by first forming glass rods having a length of 5 cm and a diameter of 0.6 cm. These rods were centerless ground to a diameter 0.0025 cm smaller than the internal diameter of the shell cavity and they were cut to the desired length to form the glass preforms. In situ lens formation was accomplished by sealing the assembled piece parts in a belt furnace (FIG. 7) at a maximum temperature of 900° C. Total furnace time was 3 hours. After the sealing operation was completed, the excess glass was machined out to yield the completed component, as shown in FIG. 9. To be noted in that figure, is the vertical glass wall 69 remaining in the shell cavity. The thickness of that wall, or for that matter, its existence, depends on the size of the charge cavity ultimately desired.

The time-temperature furnace parameters used to form the in situ lens were carefully developed to perform several operations simultaneously. The first is to precipitation-harden the Inconel 718 shell; the second is to form a hermetic seal between the glass and the shell; and the third, and most important task, is to form the in situ lens. By understanding the temperature-viscosity relationship of the selected glass and by carefully controlling the time-temperature parameters of the furnace, it is possible to form an in situ lens within the component. This is accomplished by controlling the temperature of the furnace to allow the glass to flow and form a convex shape as it softens and flows down through the bottom hole of the shell. On cooling, the glass sets up, resulting in an in situ lens, as shown in FIG. 9. In essence, the in situ lens acts as a plano-convex lens, whose focal length can easily be calculated using standard lens formulas.

The processing parameters, then, perform three functions: 1) the Inconel 718 is precipitation-hardened with a measured hardness greater than Rockwell C40; 2) the components fabricated by the process are hermetic (helium leak rate of less then $10^{-8}$ cm$^3$/sec); and 3) the integral window portion of the components contains an in situ (plano-convex) lens. In situ lens components fabricated by the technique described above and loaded with an energetic material, e.g., HMX/carbon black, have been ignited to measure their functional threshold values. It has thus been determined that the in situ lens formed within the component significantly decreases the threshold value by a factor of about 5. Components equipped with an in situ lens have a 50% all fire laser threshold of about 30 mJ, while components with an integral window of the same thickness had a laser threshold of >150 mJ. The lower threshold allows the use of more reliable and less expensive laser systems.

The processing and dimensional parameters cited, as well as the materials used, in the Examples are not the only variations that have been successfully employed in the fabrication of integral windows and in situ lenses. Different metals, glasses, and so on, can be used in the fabrication of laser-ignitable integral window components with or without in situ lenses and suitable modifications of the working parameters can be made, by those skilled in the art, to accommodate these different materials without departing from the scope of the invention as defined by the appended claims. In any event, it is believed that these new hermetic, laser-ignitable components with integral windows and in situ lenses will find numerous applications, inter alia, in explosive technology.

We claim:

1. A method of hermetically sealing a transparent glass window to a metal shell, comprising:
   a) placing an aluminoborosilicate glass preform in a cup-like cavity in a metal shell, said cup-like cavity having a minor opening through its floor;
   b) heating the preform and shell in a belt furnace by first passing them consecutively through four heating zones with temperatures of about 700°, 855°, 865°, and 625° C., respectively, for an overall furnace residence period of about 2.5 hours and then rapidly through a cooling zone;

wherein said glass is selected from the group consisting of an aluminoborosilicate glass containing, in parts by weight: silica, 49.8; boron oxide, 16.9; alumina, 12.2; potassium oxide, 5.4; fluorine, 1.8; calcium oxide, 0.5; and zinc oxide, 0.7; and an aluminoborosilicate glass containing, on a weight basis; silica, 48.8; boron oxide, 16.6; sodium oxide, 14.4; alumina, 11.9; potassium oxide, 5.3; fluorine, 2.0; calcium oxide, 5.0; and zinc oxide, 0.7;

and wherein said metal is selected from the group consisting of high strength nickel-based corrosion resistant alloys and corrosion resistant nickel-chromium alloys.

* * * * *